United States Patent [19]
Chien et al.

[11] Patent Number: 5,600,480
[45] Date of Patent: Feb. 4, 1997

[54] ULTRA-LOW ACOUSTIC RESONANCE ELECTRO-OPTIC MODULATOR

[75] Inventors: Kuei-Ru Chien, Cerritos; Robin A. Reeder, Hawthorne, both of Calif.

[73] Assignee: Hughes Aircraft Company, Los Angeles, Calif.

[21] Appl. No.: 122,625

[22] Filed: Sep. 17, 1993

[51] Int. Cl.$^6$ .................. G02F 1/03; G02F 1/07
[52] U.S. Cl. ............ 359/245; 359/249; 359/247; 359/254
[58] Field of Search .................. 359/245, 249, 359/254, 247, 285

[56] References Cited

U.S. PATENT DOCUMENTS

| | | | |
|---|---|---|---|
| 3,653,743 | 4/1972 | Kiefer et al. | 359/249 |
| 3,678,574 | 7/1972 | Biazzo et al. | |
| 5,079,642 | 1/1992 | Dreisewerd et al. | 359/245 |
| 5,221,988 | 6/1993 | Juhasz | 359/249 |

OTHER PUBLICATIONS

R. L. Shoemaker et al, "Frequency-switchable $CO_2$ laser: design and performance", Applied Optics, vol 21, No. 5, pp. 961–966 (1 Mar. 1982).
J. E. Kiefer et al, "Intracavity CdTe Modulators for $CO_2$ Lasers", IEEE Journal of Quantum Electronics, Vol. QE–8, No. 2, pp. 173–179 (Feb. 1972).
Patent Abstracts of Japan, vol. 012, No. 051 (P–667), 16 Feb. 1988 & JP-A-62 198824 (Hitachi) 2 Sep. 1987— Abstract only.

*Primary Examiner*—Paul M. Dzierzynski
*Assistant Examiner*—Audrey Y. Chang
*Attorney, Agent, or Firm*—M. E. Lachman; M. W. Sales; W. K. Denson-Low

[57] ABSTRACT

An improved electro-optic modulator having reduced amplitude of acoustic resonances is provided. Acoustic energy is efficiently removed from the electro-optic crystal and channeled into electrode and side dielectric bars where it is dissipated by materials acoustically matched to the electro-optic crystal, that is, materials that have acoustic impedances within ±15% of that of the electro-optic material.

22 Claims, 2 Drawing Sheets

ULTRA-LOW ACOUSTIC RESONANCE ELECTRO-OPTIC MODULATOR

BACKGROUND OF THE INVENTION

1. Field of the Invention

The present invention relates to an improved electro-optic modulator for reducing the amplitude of crystal resonance. Acoustic energy is efficiently removed from the crystal by the acoustically matched electrodes and side bars where it is dissipated by scattering and absorption.

2. Description of Related Art

All wideband frequency modulated (FM) chirped $CO_2$ lasers exhibit pronounced amplitude modulation (AM), as a side effect to the desired FM modulation. Excitation of the FM electro-optic modulator crystal's acoustic resonance is one of the drivers of the AM modulation. Reduction of the crystal's resonance amplitude will directly reduce the unwanted AM modulation.

Some solid state lasers having high repetition rate solid state Q-switches also suffer from acoustic oscillation, causing the switch to ring open when it should be shut.

Prior to the present invention, copper was used as the electrode material and alumina ($Al_2O_3$) or beryllia (BeO) was used as a side bar material (electrically, it works as an insulator) in many CdTe electro-optic modulators. Indium was also used between the electro-optic modulator crystal and the electrodes to fill up any surface irregularities that improve the acoustic coupling between electrodes and CdTe crystal. These materials do not exhibit acoustic impedances which closely match that of electro-optic modulator's CdTe crystal and therefore contribute to an increase in the amplitude of the electro-optic crystal's acoustic resonance.

Two references that exemplify the use of intracavity CdTe modulators for $CO_2$ lasers are: R. L. Shoemaker et al, "Frequency-switchable $CO_2$ laser: design and performance", Applied Optics, Vol. 21, No. 5, pp. 961–966 (1 Mar. 1982) and J. E. Kiefer et al, "Intracavity CdTe Modulators for $CO_2$ Lasers", *IEEE Journal of Quantum Electronics*, Vol. QE-8, No. 2, pp. 173–179 (February 1972).

An electro-optic crystal must be damped in some manner to reduce the amplitude of the acoustic resonances. This must be done for a variety of reasons. The crystal can actually fracture under some circumstances if it is not properly damped. Less catastrophic though often vital, the crystal will ring at its natural resonance, giving rise to many problems. These include leakage through an electrooptic shutter, unwanted lasing spikes, frequency chirping, and other effects.

Thus, a need exists for an improved electro-optic modulator that minimizes the above-mentioned disadvantages.

SUMMARY OF THE INVENTION

In accordance with the invention, an improved electro-optic modulator is provided which comprises:

(a) an electro-optic crystal having (1) electrodes for creating a change in voltage across the electrooptic crystal and, optionally, (2) dielectric sides (insulators) for positioning the electro-optic crystal; and (b) means for reducing the amplitude of acoustic resonance in the electro-optic crystal, the means comprising a metal for said metal electrodes and a dielectric material for the dielectric sides that each have an acoustic impedance that is within 15% of that of the electro-optic crystal.

The improved CdTe electro-optic modulator includes the use of aluminum for the electrodes and boron nitride for the side bars. These materials exhibit acoustic impedances which closely match those of CdTe electro-optic modulator crystals. Thus, they serve to decrease the amplitude of the electro-optic crystal's resonance.

For electro-optic modulators with $LiNbO_3$ crystals, the use of brass for the electrodes offers a similar acoustic impedance match between the crystal and electrodes and a resulting reduction in the amplitude of the electro-optic crystal's resonance. Other electro-optic modulator configurations are possible which do not require the use of side bars.

Indium is still used between the electro-optic modulator crystal and the electrodes to fill up any surface irregularities, which result in poor coupling of the acoustic energy into the electrodes. Because indium is a poor acoustic match to the crystal and electrodes, it must be made fairly thin (approximately 0.005 inch) so that the resulting acoustic match between the crystal and electrodes is good.

DESCRIPTION OF THE PREFERRED EMBODIMENTS

The present invention reduces the amplitude of the crystal resonance by efficiently removing the acoustic energy from the crystal and channeling it into the electrode and side bars, where it is dissipated. The electrodes and side bars in the electro-optic modulator comprise a material that is a good acoustic match to the electro-optic crystal. By "good acoustic match" is meant herein that the electrode and side bar materials each have an acoustic impedance that is within about 15% of that of the electro-optic crystal. Thus, energy can pass out of the crystal at the interface without reflection, thereby reducing the Q of the resonance, i.e, reducing the amplitude of the crystal oscillation. Dissipation of the acoustic energy is done away from the crystal by either absorbing or scattering the acoustic waves.

Dissipation of the acoustic energy can be done in a variety of ways. The simplest way is to simply scatter the acoustic waves by directing them against a tilted surface in the electrodes (and side bars). Other scattering geometries are also possible. In addition, more complex geometries that include acoustically absorbing materials (such as lead) may be used.

For CdTe, aluminum electrodes and boron nitride side walls are used, though other materials are possible. For LiNbO$_3$, brass is a good choice of electrodes, and side bars may or may not be necessary.

Figure 1:
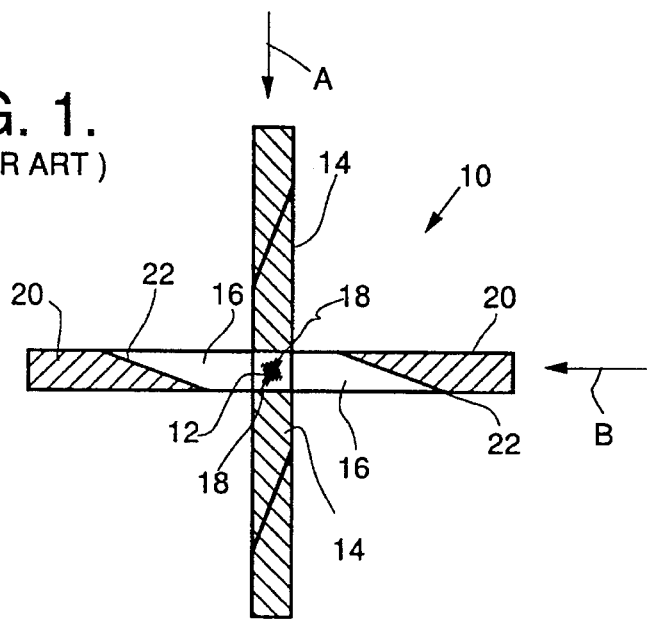
FIG. 1 illustrates the major components in an electro-optic modulator.

FIG. 1 shows a view of the major components in prior art electro-optic modulator 10 comprising a CdTe electro-optic crystal 12 with aluminum electrodes 14, boron nitride sides 16, an indium interface 18 between the electrodes and crystal, and the outer most aluminum pieces 20. Arrows A and B also indicate the direction of forces required for configuring the electro-optic modulator 1O.

Table I lists the acoustic impedance relative to CdTe of several materials.

TABLE I

Acoustic Impedance of Materials.

| Material | Acoustic Impedance (relative to CdTe) |
| --- | --- |
| Air | $3 \times 10^{-5}$ |
| Aluminum | 0.93 |
| Alumina | 2.49 |
| Beryllia | 2.28 |
| Boron nitride | 0.86 |
| Copper | 2.19 |
| Indium | 0.60 |
| Lead | 0.85 |

Copper has been used as the electrode material for CdTe modulators. However, aluminum is a much better material to use for the electrode because of its closer acoustic impedance match to CdTe, 0.93 as compared with 2.19 for copper, or a 7% difference as compared with a 119% difference. In both cases, indium is used between the CdTe crystal and the electrode to fill up any surface irregularities. Since indium is a poor acoustic match to CdTe, with a relative acoustic impedance of 0.60, it is made thin relative to the acoustic wavelength, so that the reflection at the interface is small.

For an indium thickness of 0.005 inch between the CdTe crystal and the aluminum electrode, the acoustic reflection from the interface is 4.0%. Making the indium thickness smaller would reduce the reflection in theory, i.e., 0.002 inch of indium should have an interface reflection of 0.8%, but in practice the interface is difficult to achieve because of the increased clamping force necessary to deform the indium so that it fills the interface irregularities.

Beryllia or alumina has also been used as a side bar material in these CdTe modulators. Boron nitride is a better acoustic match, with a relative acoustic impedance of 0.86 as compared with 2.49 for alumina. This side bar material is not as important as the electrode material, because it is very difficult to get good acoustic coupling between the CdTe and the side bars. Surface irregularities tend to ruin the dry interface because air has such poor acoustic properties, with a relative acoustic impedance of $3\times10^{-5}$. Indium is the only good dry interface material yet found although it cannot be used on this interface because it would electrically short the electrodes. Wet interfaces are very good acoustically, but they tend to migrate and cause optical damage. This material change would be more effective if a good dry, non-migrating, interface material were found.

These changes result in a reduction of the acoustic resonant amplitude from 3 to 10 decibels (dB), down to less than 0.5 dB. This result was obtained both with and without side bars, indicating that the sides are not necessary in CdTe FM modulators. This would greatly reduce the complexity of the modulator design, although cooling would still have to be considered.

EXAMPLES

Example 1

Figure 2:
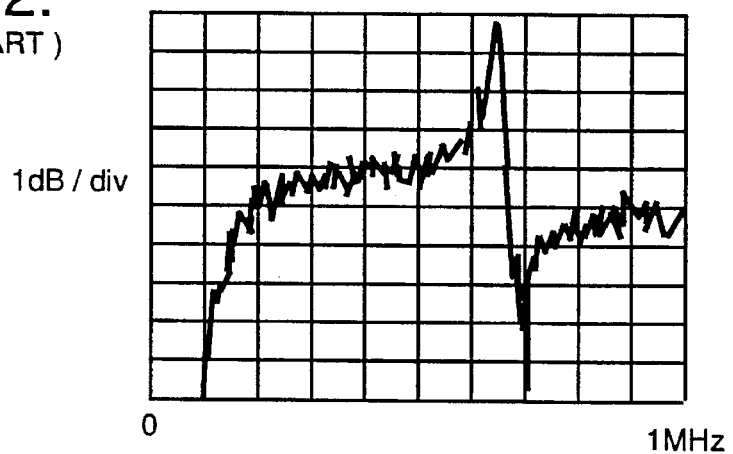
FIG. 2 on coordinates of acoustic resonant amplitude (in decibels) and frequency (in Mega Hertz), is an oscilloscope trace, depicting the acoustic properties of a prior art electro-optic modulator comprising CdTe, having copper electrodes and alumina sides bars.

The acoustic properties of an electro-optic modulator having copper electrodes and alumina side bars were tested by placing the CdTe crystal between crossed polarizers (the principle axes of the crystal at 45° C. to the polarizers), in the path of a probe $CO_2$ laser beam, and applying a frequency swept voltage (from a network analyzer) to the crystal electrodes. The light that gets through is mostly due to the crystal partially depolarizing the radiation. This depolarization is a result of both the electro-optic effect (a voltage causing a phase change) and the elasto-optic effect (a stress causing a phase change). The resonance peak is where the voltage is driving a mechanical oscillation. The output voltage of a photo-voltaic detector, which is monitoring the power transmitted through the system, is fed back into the network analyzer, generating a response curve of the crystal as a function of frequency. FIG. 2 is an oscilloscope trace of the acoustic properties of a prior art CdTe electro-optic modulator having copper electrodes and alumina side bars with a resonance peak of 3.2 dB. The low frequency roll-on characteristics are an artifact of the experiment.

Example 2

Figure 3:
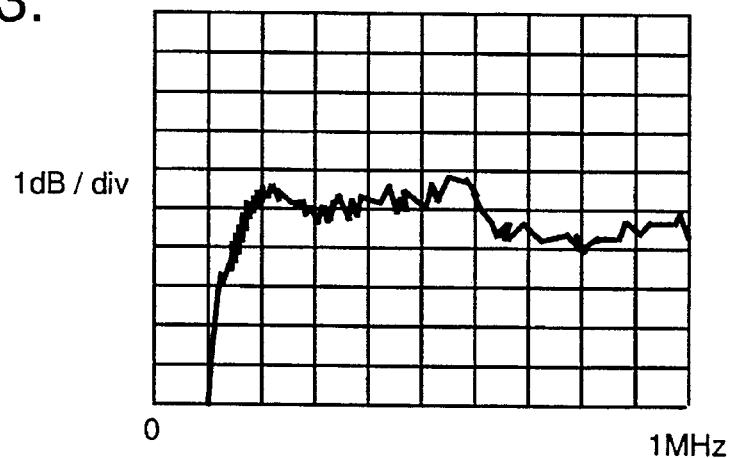
FIG. 3 on coordinates of acoustic resonant amplitude (in decibels) and frequency (in Mega Hertz), is an oscilloscope trace, depicting the acoustic properties of an electro-optic modulator comprising CdTe, having aluminum electrodes and boron nitride sides bars, in accordance with the invention.

A test procedure similar to Example 1 was conducted for a CdTe electro-optic modulator having aluminum electrodes and boron nitride side bars, in accordance with the invention. FIG. 3 is an oscilloscope trace of the acoustic properties of this electro-optic modulator, showing no visible resonance peak.

Example 3

Figure 4:
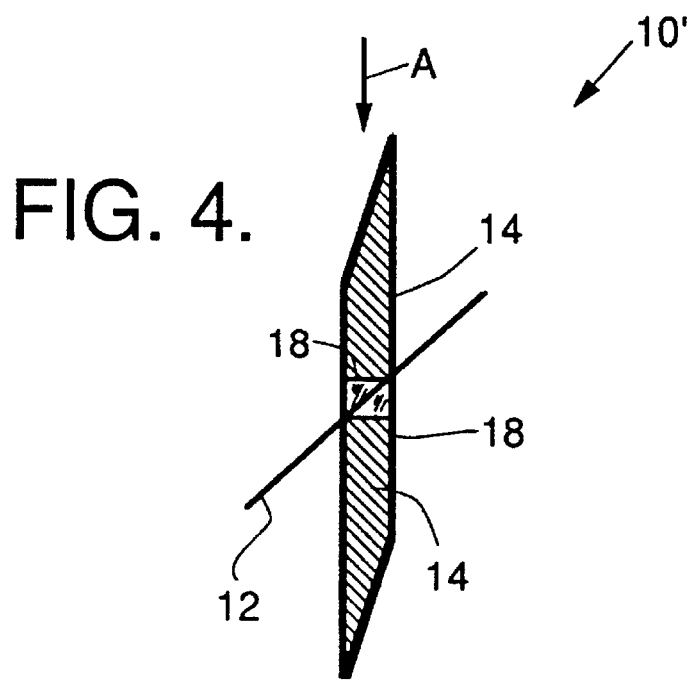
FIG. 4 illustrates an electro-optic modulator similar to that of FIG. 1, but with no side bars.
Figure 5:
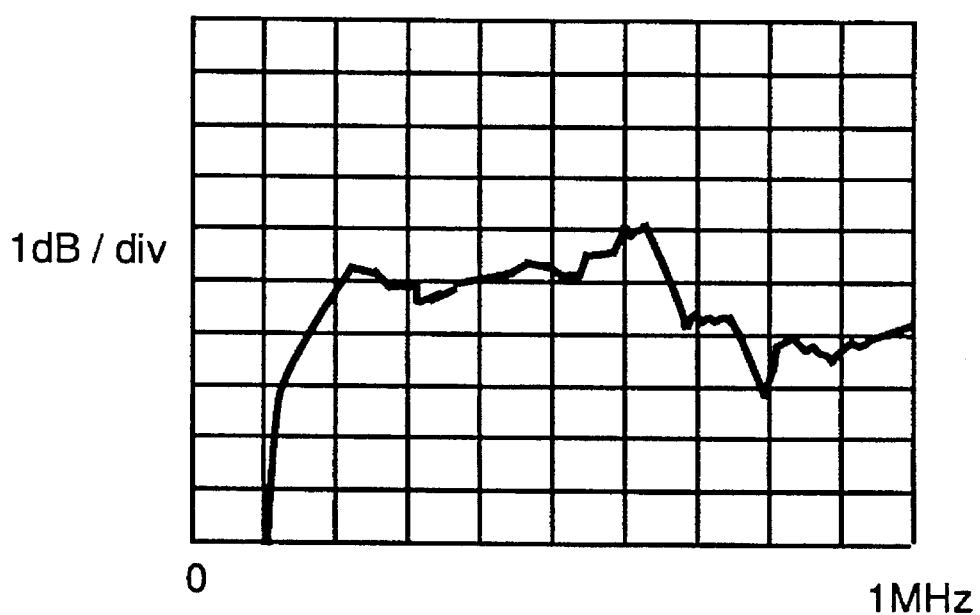
FIG. 5 on coordinates of acoustic resonant amplitude (in decibels) and frequency (in Mega Hertz), is an oscilloscope trace, depicting the acoustic properties of a CdTe electro-optic modulator having aluminum electrodes and no sides bars, in accordance with the invention.

FIG. 4 shows an electro-optic modulator 10', having no side bars. This device was tested using a procedure similar to Example 1. FIG. 5 is an oscilloscope trace of the acoustic properties of a CdTe electro-optic modulator having aluminum electrodes and no side bars, in accordance with the invention. There is no visible resonance peak when the side bars are omitted, thus indicating that the sides are not necessary in CdTe FM modulators. This would greatly reduce the complexity of the modulator design, although cooling and thermal lensing would still have to be considered.

Thus, there has been disclosed an improved electro-optic modulator for reducing problems associated with acoustic resonance. It will be readily apparent to those of ordinary skill in this art that various changes and modifications of an obvious nature may be made, and all such changes and modifications are considered to fall within the scope of the invention, as defined by the appended claims.

What is claimed is:

1. An electro-optic modulator consisting of:

(a) an electro-optic crystal;

(b) first and second metal electrodes for creating a change in voltage across said electro-optic crystal; and (c) an interface between said electro-optic crystal and said metal electrodes providing contact between said electro-optic crystal and said metal electrodes, wherein said first and second metal electrodes comprise a metal having an acoustic impedance that is within 15% of the acoustic impedance of said electro-optic crystal whereby said first and second metal electrodes reduce the amplitude of acoustic resonance in said electro-optic crystal.

2. The electro-optic modulator of claim 1 wherein said electro-optic crystal consists essentially of a material selected from the group consisting of CdTe and $LiNbO_3$.

3. The electro-optic modulator of claim 1 wherein said electro-optic crystal consists essentially of $LiNbO_3$.

4. The electro-optic modulator of claim 3 wherein said electrodes comprise brass.

5. The electro-optic modulator of claim 3 having an indium interface between said electrodes and said electro-optic crystal.

6. A method for reducing crystal resonance amplitude in an electro-optic crystal modulator consisting of:

(a) an electro-optic crystal;

(b) first and second metal electrodes for creating a change in voltage across said electro-optic crystal; and (c) an interface between said electro-optic crystal and said metal electrodes providing contact between said electro-optic crystal and said metal electrodes, said method comprising forming said electrodes from a material that is acoustically matched within 15% to said electro-optic crystal wherein said acoustic energy is removed from said electro-optic crystal and channeled into said electrodes to thereby dissipate said acoustic energy.

7. The method of claim 6 wherein said electro-optic crystal consists essentially of a material selected from the group conSisting of CdTe and $LiNbO_3$.

8. The method of claim 6 wherein said electro-optic crystal consists essentially of $LiNbO_3$.

9. The method of claim 8 wherein said electrodes comprise brass.

10. The method of claim 8 having an indium interface between said electrodes and said electro-optic crystal.

11. An electro-optic modulator consisting of:

(a) an electro-optic crystal;

(b) first and second metal electrodes for creating a change in voltage across said electro-optic crystal;

(c) an interface between said electro-optic crystal and said metal electrodes providing contact between said electro-optic crystal and said metal electrodes, wherein said first and second metal electrodes comprise a metal having an acoustic impedance that is within 15% of the acoustic impedance of said electro-optic crystal whereby said first and second metal electrodes reduce the amplitude of acoustic resonance in said electro-optic crystal;

(d) first and second dielectric side bars for positioning said electro-optic crystal wherein said dielectric side bars comprise a dielectric material having an acoustic impedance that is within 15% of the acoustic impedance of said electro-optic crystal whereby said side bars further reduce said amplitude of said acoustic resonance in said electro-optic crystal.

12. The electro-optic modulator of claim 11 wherein said electro-optic crystal consists essentially of a material selected from the group consisting of CdTe and $LiNbO_3$.

13. The electro-optic modulator of claim 11 wherein said electro-optic crystal consists essentially of CdTe.

14. The electro-optic modulator of claim 13 wherein said electrodes comprise aluminum.

15. The electro-optic modulator of claim 13 wherein said dielectric sides comprise boron nitride.

16. The electro-optic modulator of claim 13 having an indium interface between said electrodes and said electro-optic crystal.

17. A method for reducing crystal resonance amplitude in an electro-optic crystal modulator consisting of:

(a) an electro-optic crystal;

(b) first and second metal electrodes for creating a change in voltage across said electro-optic crystal;

(c) an interface between said electro-optic crystal and said metal electrodes providing contact between said electro-optic crystal and said metal electrodes; and (d) first and second dielectric side bars for positioning said electro-optic crystal said method comprising forming said electrodes and said dielectric side bars from a material that is acoustically matched within 15% to said electro-optic crystal wherein said acoustic energy is removed from said electro-optic crystal and channeled into said electrodes and said side bars to thereby dissipate said acoustic energy.

18. The method of claim 17 wherein said electro-optic crystal consists essentially of a material selected from the group consisting of CdTe and $LiNbO_3$.

19. The method of claim 17 wherein said electro-optic crystal consists essentially of CdTe.

20. The method of claim 19 wherein said electrodes comprise aluminum.

21. The method of claim 19 wherein said dielectric sides comprise boron nitride.

22. The method of claim 19 having an indium interface between said electrodes and said electro-optic crystal.

* * * * *